April 26, 1932.                P. THELEN                1,856,003
                    WASTE TRAP FOR BASINS AND THE LIKE
                           Filed Nov. 3, 1930
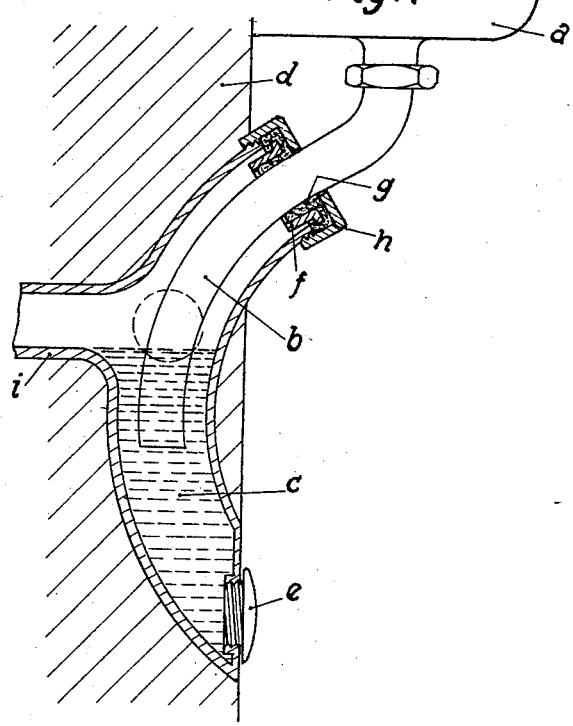
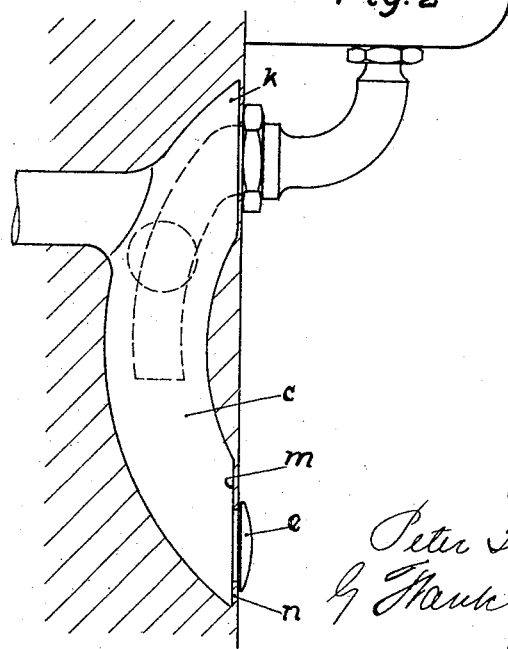

Patented Apr. 26, 1932

1,856,003

UNITED STATES PATENT OFFICE

PETER THELEN, OF COLOGNE-ON-THE-RHINE, GERMANY

WASTE TRAP FOR BASINS AND THE LIKE

Application filed November 3, 1930, Serial No. 493,206, and in Germany October 12, 1929.

Waste traps for wash basins and the like as known heretofore are generally constructed after the manner of a siphon, the S-bent part of which is always exposed under the basin. Other constructions are known in which the waste trap from the basin ends in a detachable container from the top portion of which the drain pipe extends. These constructions also are exposed and, in consequence, can be easily damaged.

The object of the invention is to place the waste trap out of sight so that a clear wall remains and corners which are difficult to clean are dispensed with but, at the same time, to facilitate the cleaning of the trap as well as the waste pipe.

According to the invention I provide a waste trap sunk into the wall so that only the ends project or are visible, the waste trap being curved in the longitudinal direction. If this device is firmly and completely let into the wall the waste pipe, connected to the trap—after removal of the dip pipe—can easily be cleaned from above. In order to empty the waste trap the screw plug fitted on the lower end thereof is loosened or removed.

Two embodiments of the invention are shown in the drawings:

Fig. 1 shows one device in part section.

Fig. 2 is an elevation of a further construction.

In the construction according to Fig. 1 the pipe $b$ fitted to the wash basin is led into a piece of tubing $c$ which is bent into such a shape that it can be entirely let into the wall. This piece of tubing terminates in a cleaning screw $e$ at its bottom end. At the upper end a clamping nut is arranged which connects the dip pipe $b$ with the tubing. The clamping nut has an internal guiding ring $f$ which is held in position by means of the screw ring $h$ with an interposed layer of hemp packing $g$. A reliable packing is obtained in this manner and escape of the gases prevented. The dip pipe is easily detachable after the clamping nut arrangement has been loosened, when a cleaning wire or spring can be inserted directly into the pipe.

A waste pipe $i$ can be arranged on the side, as shown by dotted lines or behind, as indicated by full lines.

The construction according to Fig. 2 is the same as that above described, except that the end $k$ of the waste trap, as well as the end $n$ in which the cleaning screw $e$ is fitted, is arranged in a plane parallel to the wall surface, so that these ends $k$, $n$ are covered by plaster as far as to the openings.

What I claim is:—

1. A waste pipe connection adapted to be embedded in a house wall and including an arcuate pipe having its lower end closed by a vertical wall provided with a clean-out opening, said vertical wall being adapted to lie flush with a house wall, and a clean-out plug removably fitted in said opening.

2. A waste pipe connection adapted to be embedded in a house wall and including an arcuate pipe having its lower end closed by a vertical wall provided with a clean-out opening, said vertical wall being adapted to lie flush with a house wall, a clean-out plug removably fitted in said opening, the upper end of the arcuate pipe being arranged to project from the house wall upon the lower end being flush therewith, a packing gland on the upper end of said pipe, and a waste inlet pipe extending into the arcuate pipe through said gland.

3. A waste pipe connection adapted to be embedded in a house wall and including an arcuate pipe having its lower end closed by a vertical wall provided with a clean-out opening, said vertical wall being adapted to lie flush with a house wall, a clean-out plug removably fitted in said opening, the upper end of the arcuate pipe being arranged to project from the house wall upon the lower end being flush therewith, a packing gland on the upper end of said pipe, a waste inlet pipe extending into the arcuate pipe through said gland, said waste inlet pipe being of smaller diameter than the first pipe and being similarly arcuate to lie concentrically therein and projecting for a considerable distance into the first pipe, and an outlet branch extending horizontally from the first pipe above the lower end of the second pipe.

In testimony whereof I affix my signature.

PETER THELEN.